April 30, 1946.                 J. D'ERRICO                  2,399,332
                              AMUSEMENT RIDE
                           Filed Feb. 22, 1944            3 Sheets-Sheet 1
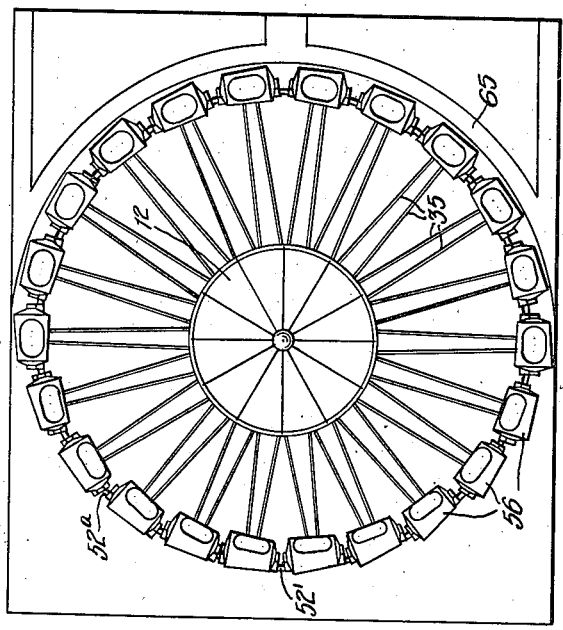
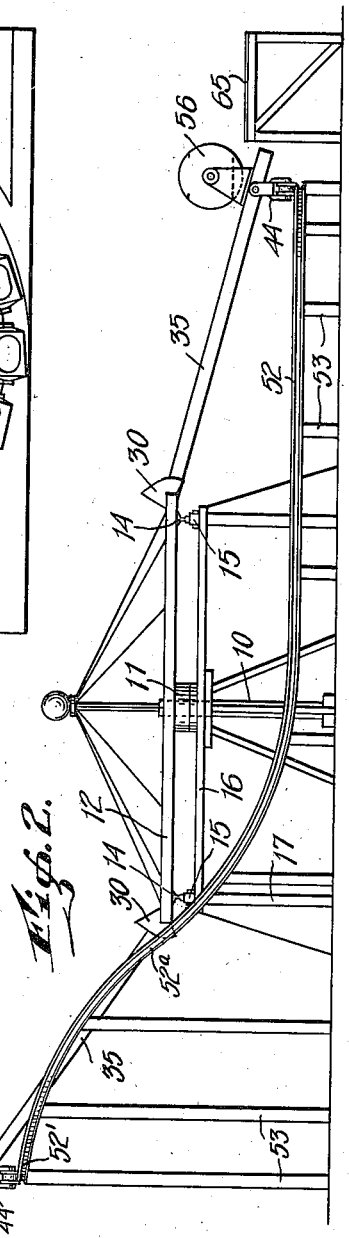
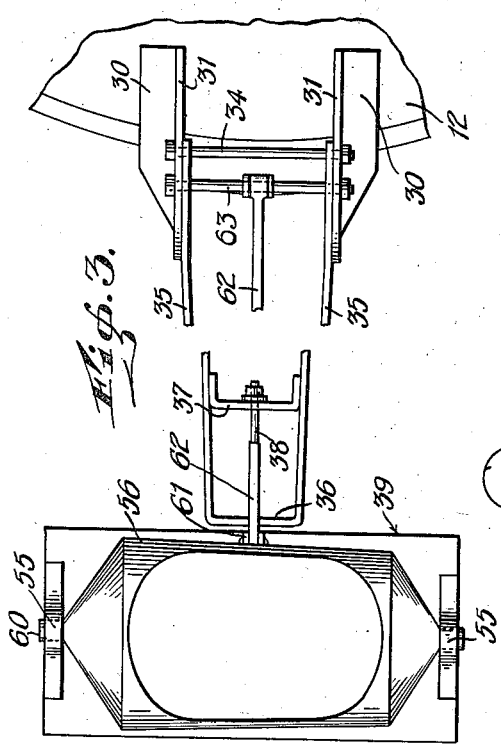
INVENTOR
JOHN D'ERRICO
BY
ATTORNEY

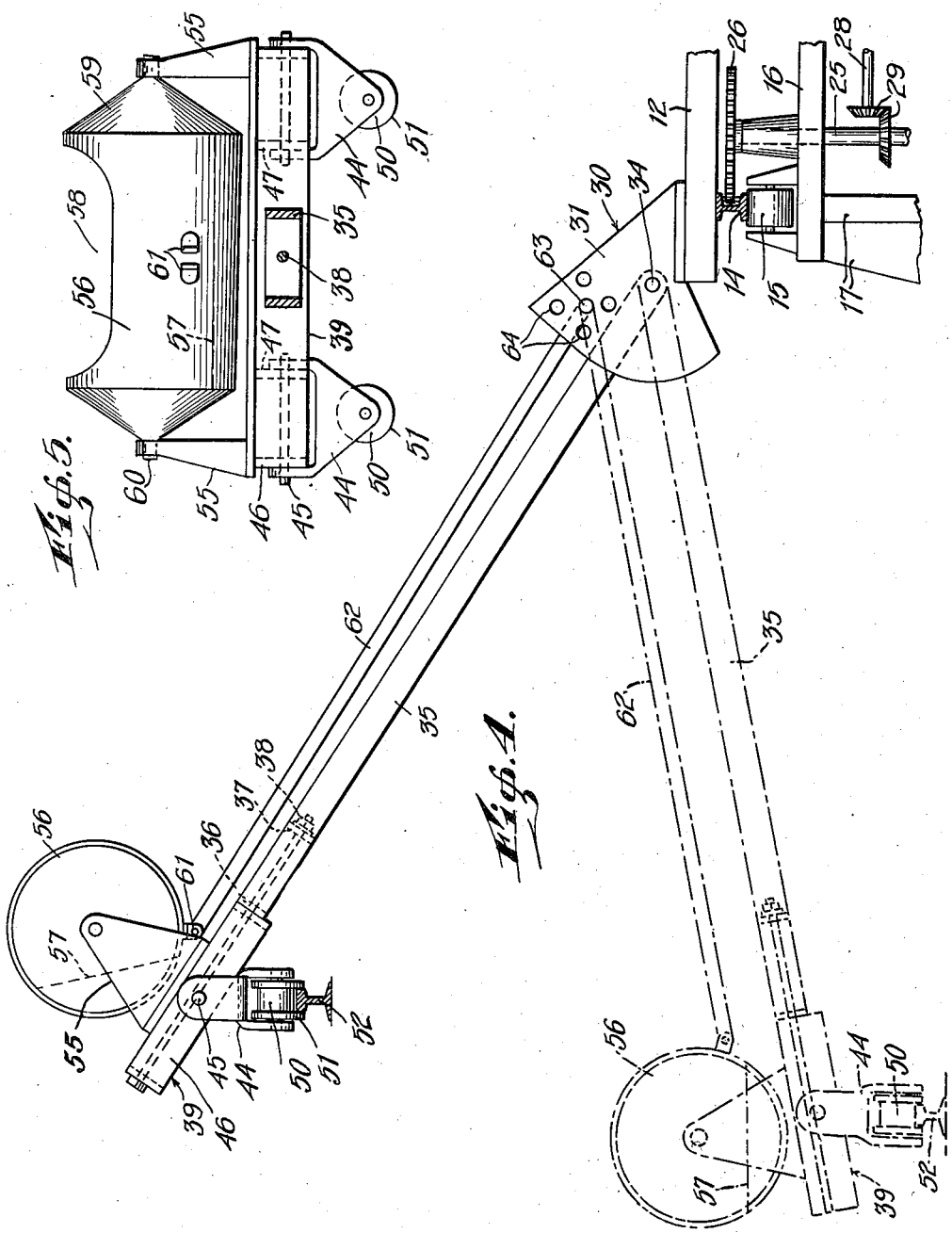

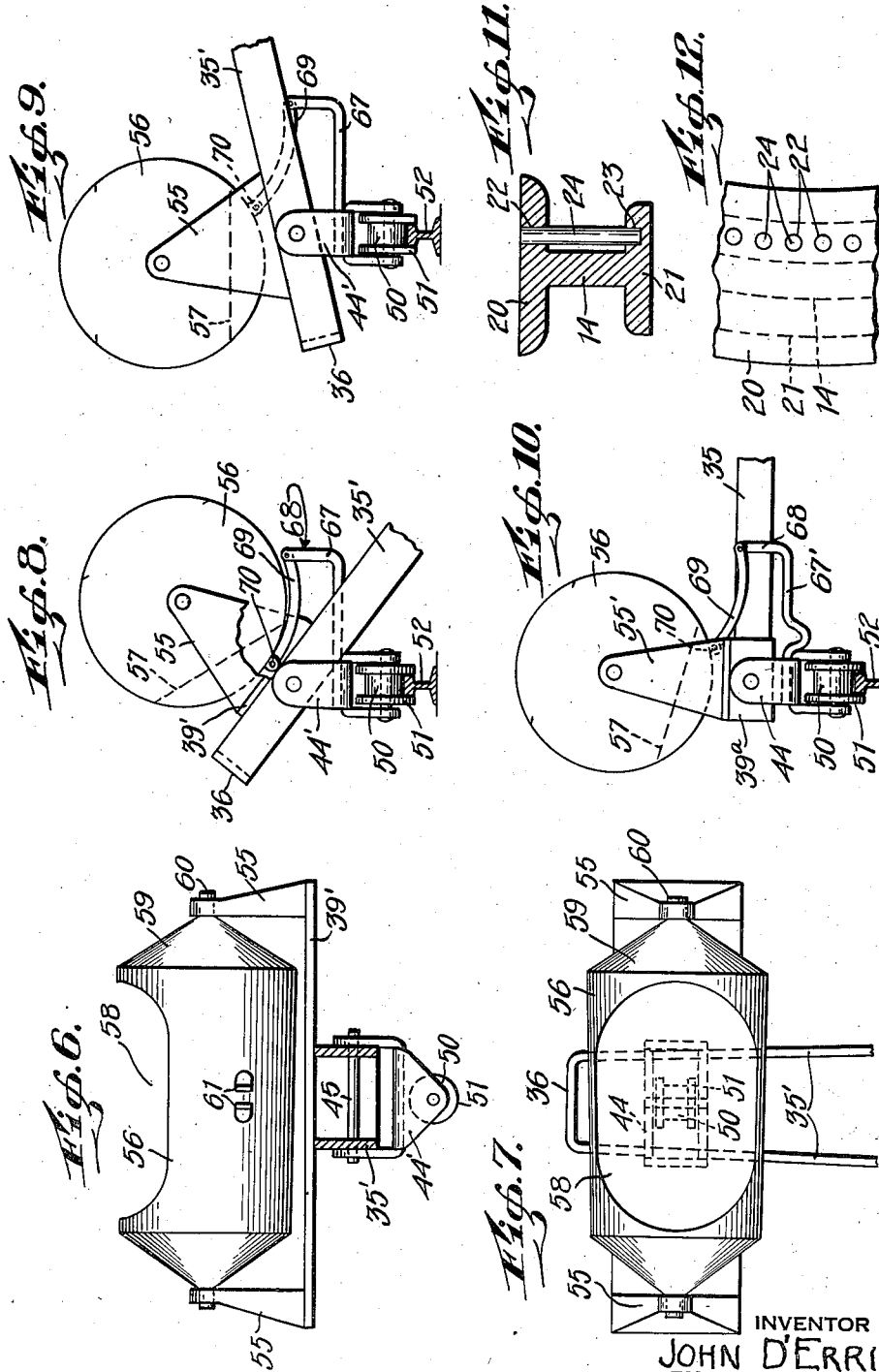

Patented Apr. 30, 1946

2,399,332

UNITED STATES PATENT OFFICE 2,399,332

AMUSEMENT RIDE

John D'Errico, Brooklyn, N. Y.

Application February 22, 1944, Serial No. 523,420

17 Claims. (Cl. 272—44)

This invention relates to playground, carnival or amusement devices and more particularly to the type known as roundabouts or amusement rides, though it is noted that in some of the claims the invention is not limited to such devices.

One object of the invention is to provide an improved device or apparatus of this kind which will carry passengers over track irregularities giving them an up and down hill sensation in riding and will tilt and oscillate the passenger cars laterally and longitudinally to add to their thrills and enjoyment.

Other objects of the invention are to provide an improved device of this kind which may be built from materials frequently conveniently at hand and one in which no elaborate system of gears is required.

Additional objects of the invention are to effect simplicity and efficiency in such apparatus and to provide an extremely simple apparatus of this kind which is economical, durable, safe and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a roundabout or amusement ride which briefly stated, includes a rotary platform to which are connected a plurality of long radial sweeps pivoted to the peripheral portions of the platform and free to oscillate in a vertical plane radial to the platform, each sweep carrying at its outer end a car frame having one or more downwardly projecting castor brackets pivotally mounted on the truck member of the frame to oscillate in a transverse plane of the car frame, the castors having broad flanges engageable on an endless track surrounding, and a distance from, the platform, the track being of irregular slope and altitude and at such a distance from the platform as to permit elevation of the outer ends of the sweeps with the castors remaining on the track. On each car frame is mounted for oscillation about a longitudinal axis a car in which the passengers ride, means being provided to oscillate the cars laterally as they travel around the track.

In the accompanying drawings showing, by way of example, several of many possible embodiments of the invention, Fig. 1 is a diagrammatic plan showing the relative location of the principal parts of the apparatus, some other parts being omitted;

Fig. 2 is a diagrammatic vertical sectional view showing the rail and an associated loading platform in section on a diameter of the apparatus, the platform and associate parts, and the rail and associate parts behind said diameter, being shown in elevation, some other parts being omitted;

Fig. 3 is a fragmental plan showing a car, an associated sweep and a portion of the platform;

Fig. 4 is a side elevation of the parts of Fig. 3, showing different positions in full and dotted lines respectively;

Fig. 5 is a side elevation of the car, part of the sweep being in section;

Figs. 6 and 7 are respectively side elevation and plan showing a car and another form of mounting, the sweep of Fig. 6 being shown partly in section;

Figs. 8 and 9 are end elevations of a car showing different positions of another form of mounting, the track rail being in section;

Fig. 10 is an end elevation of a car showing still another form of car mounting; and Figs. 11 and 12 are cross-section and fragmental plans showing a detail of a gear forming a part of the means for supporting and rotating said platform.

The principal parts of my improved amusement ride revolve about a fixed vertical shaft 10 (Fig. 2) provided with an upper bearing portion 11 on which is rotatably received a circular platform 12 having fast on the lower face of its peripheral portion an annular inverted I-beam rail 14 resting on the rollers of a plurality of inverted castors 15 (Fig. 4) mounted transverse to the rail and fast on and around the margin of a lower fixed framework or platform 16 spaced just below the rotary platform and supported by braced pillars 17, whereby the rotary platform is rotatably supported.

The inner margin of the upper flange or base 20 (Fig. 11) and the lower flange or head 21 of the rail are respectively provided with a series of vertical holes or bores 22 and lower sockets 23 alined with the holes, said bores and sockets receiving a plurality of vertical rods 24 functioning as driven teeth of a large internal driven gear which they form.

A substantially vertical drive shaft 25 (Fig. 4) mounted in said frame work 16 carries a drive gear 26 meshing with the rods 24 to rotate the platform. A power shaft 28 driven by a suitable source of power (not shown) drives the drive shaft 25 through suitable miter gears 29.

A plurality of pairs of sweep mounting brackets 30 (Figs. 3 and 4) mounted fast on the peripheral portion of the platform 12 comprise two approximately radially projecting parallel upright side plates 31 provided with pivot holes to support a pivot pin 34 perpendicular to said plates and a radial plane of the platform, on which pin a long sweep 35, 36 comprising arms 35 and an outer end yoke or header plate 36 is pivoted and is free to oscillate in a vertical radial plane of the platform, the side plates 31 being wide enough and shaped to engage an appreciable length of the arm to partially relieve stress on the pin.

Said header plate 36 and an additional transverse plate 37 secured to the arm are provided with contact bearing openings in which are received a swivel rod or shaft 38 passing through the sides of an elongated car supported frame 39 swiveled on said shaft transversely to the outer end of said sweep and oscillatory about the longitudinal axis of the sweep. Said frame is provided at each end with downwardly projecting castors 44 pivotally mounted on the swivel shafts 45 passing through the ends 46 of the frame and transverse plates 47 (Fig. 5) secured near said ends whereby the castors may oscillate in a transverse plane of the car frame. Said castors include wheels 50 having prominent flanges 51 received and guided on an endless, preferably mono-rail, track 52, 52' (Fig. 2) surrounding and at a distance from the platform and frame and carried by a suitable support 53, the track supporting the castors, frame and outer end of the sweep, the track being of irregular slope and at a distance from the fixed post to permit the elevation of the outer ends of the sweeps while the castors are held vertically on the track by the flanges 51, as the sweeps are revolved by the rotating platform 12.

At respective opposite ends of each car frame are mounted upright brackets 55 (Figs. 4 and 5) between the upper ends of which is journaled an elongated approximately horizontally cylindrical car 56 having a flat bottom 57, an open upper part 58 and closed ends 59 provided with short journals 60 received in said brackets.

Fast on the side of each car nearest the platform 12 is a pair of bracket ears 61 to which is pivotally connected a long link 62 (Fig. 4) having its inner end pivoted on a rod 63 above and remote from the axis of the pivot 34 and received in one of the holes 64, so that the car will oscillate in the cradle arms when the outer end of the sweep is raised and lowered. The pivot 63 may be mounted in any of the plate holes 64 to adjust to a suitable or desired throw of the link and consequent oscillation of the car 56.

The bracket ears 61 are mounted below the middle part of the side of the car and the pivot pin 63 is above the pivot pin 34, the pin 63 and bracket ears 61 being so located that when the car is on the lower part of the track as at 52, the car will be substantially upright or slightly turned toward the loading platform 65, and when the car is on the higher part of the track, as at 52' the long link 62 pushes the lower part of the car outwardly, and deeply tilts the car, the amount of tilt being such as to give the desired amount of thrill to the passenger without danger of injury or spilling.

When the car passes to sloping parts of the track as at 52a, the one end castor 44 is much lowered relative to the other, and the car swivels on the rod 38, thus giving added thrills.

In the form of the invention of Figs. 6 and 7, the pivot means 38 is omitted, and the sweep arms 35' made longer and secured fast to the under face of the car supporting frame 39'. In this form, only a single castor 44' is pivoted to a rod 45 passing through the ends of the arms, the long link 62 being connected as in Fig. 4. In this form, there is only one castor, and the axis of the car is held substantially level by the arms.

In the form of the invention of Figs. 8 and 9, the car-supporting frame is also secured direct to the arms. But in this form, the castor 44' is provided with an L-shaped arm 67 with a free upturned end 68 pivoted to a short link 69 which in turn is pivoted as at 70 to an eccentric portion of the car. Thus as the car is moved across a change of elevation in the track, the relative tilting of the castor 44' with respect to the sweep is communicated by the link to give a tilting or swinging motion of the car.

In the form of the invention of Fig. 10, the car frame 39a is provided with two castors 44 as in Fig. 5, and is swiveled to the end of sweep 35, 36 in Fig. 3, and one castor is provided with an L-shaped arm 67' with a free end 68 pivoted to a short link 69 which in turn is pivoted as at 70 to an eccentric portion of the car. Thus as the car is moved across a change of grade of the track relative motion of the castor with respect to the sweep is converted to a tilting or swinging motion of the car and the two castors effect a tilting of the longitudinal axis of the car as in the form of Figs. 3 and 4.

I claim as my invention:

1. An amusement device comprising a rotatable platform; a plurality of long radial sweeps pivoted to the platform for movement in a vertical plane radial to the platform; a car frame mounted on the outer end of each sweep; a car pivotally mounted on said frame to pivot on an axis longitudinal to the frame; a link connected to the lower part of the car and pointing toward the platform axis; a castor pivotally mounted on the frame to oscillate below the frame in a plane transverse to the car frame; the castor including a wheel having broad flanges; and an endless track of irregular slope surrounding the platform and supporting the wheel; and means influenced by the variations in the track height for pushing and pulling on said link for causing said cars to oscillate relative to the car frame as the platform rotates.

2. An amusement device comprising a rotatable platform member; bracket members mounted on the peripheral portion of the platform member; a plurality of long radial sweeps pivoted to said bracket members and free to oscillate in a vertical plane radial to the platform member; a car frame mounted on the outer end of each sweep; upright brackets at each end of the frame; a car pivotally swung between said brackets to pivot on an axis longitudinal to the frame; a castor member pivotally mounted on the frame to oscillate below the frame in a plane transverse to the car frame; the castor member including a wheel having broad flanges; an endless track of irregular slope surrounding the platform and supporting the wheel; and a link pivoted at one end to the car below said axis and nearer the axis of rotation of the platform member than the pivotal axis of the car, and pivoted at its other end to one of said bracket members at a point remote from the pivot connection of that bracket member to the sweep whereby the variations in the track height cause said car to oscillate about its axis as the platform rotates.

3. A device comprising, an upright bearing shaft; a platform rotatably mounted on said shaft; an annular rail coaxially mounted fast on the under side of the platform and having gear teeth at its inner side; said rail comprising; an I-bear having a vertical web, the inner margins of the base and head of the rail being respectively provided with a plurality of regularly spaced axially vertical holes and sockets alined therewith; vertical rods in the holes and sockets adapted to function as gear teeth; and gear means engaging said teeth for rotating the platform.

4. An amusement device comprising, an upright bearing shaft; a platform rotatably mounted on said shaft; an annular rail coaxially mounted fast on the under side of the peripheral portions of the platform and having gear teeth at its inner side; said rail comprising; an I-beam having a vertical web, the inner margins of the base and head of the rail being respectively provided with a plurality of regularly spaced axially vertical holes and sockets alined therewith; vertical rods in the holes and sockets and supported at both ends by the head and base respectively and adapted to function as gear teeth; and gear means engaging said teeth for rotating the platform; an annular framework surrounding said shaft and under the platform; a plurality of rollers mounted on said framework and axially radial to said shaft and engaging the face of the head of the rail; the rail having the double function of providing a support for the peripheral portion of the platform and forming a gear with the rods.

5. An amusement device comprising a rotatable platform; a plurality of long radial sweeps pivoted to the peripheral portions of the platform and each sweep free to oscillate in a vertical plane radial to the platform; a car frame mounted on the outer end of each sweep; a car pivotally mounted on the frame to pivot on an axis longitudinal to the frame; a castor pivotally mounted on the frame to oscillate below the frame in a plane transverse to the car frame; the castor including a wheel having broad flanges; and an endless track of irregular slope surrounding the platform and supporting the wheel; and a link pivoted to the car remote from said axis influenced by the variations in the track height for causing said car to oscillate about said axis as the platform rotates.

6. An amusement device comprising a rotatable platform member; bracket members mounted on the peripheral portion of the platform member; a plurality of long radial sweeps pivoted to said bracket members and free to oscillate in a vertical plane radial to the platform member; a car frame mounted on the outer end of each sweep; upright brackets at each end of the frame; a car pivotally swung between said brackets to pivot on an axis longitudinal to the frame; a castor member pivotally mounted on the frame to oscillate below the frame in a plane transverse to the car frame; the castor member including a wheel having broad flanges; and an endless track of irregular slope surrounding the platform and supporting the wheel; and a link pivoted to the car below said axis and to one of said bracket members at a point remote from the pivot connection of that bracket member to the sweep, whereby the variations in the track height cause said car to oscillate about said axis as the platform rotates.

7. An amusement device comprising, an upright bearing shaft; a platform rotatably mounted on said shaft; an annular rail coaxially mounted fast on the under side of the platform and having gear teeth at its inner side; said rail comprising; an I-beam having a vertical web, the inner margins of the base and head of the rail being respectively provided with a plurality of regularly spaced axially vertical holes and sockets alined therewith; vertical rods in the holes and sockets adapted to function as gear teeth; gear means engaging said teeth for rotating the platform; a framework surrounding the shaft, rollers mounted on the framework and engaging said rail to support the peripheral portions of the platform; a plurality of pairs of approximately radially projecting parallel side plates mounted on the peripheral portion of the platform; and long sweeps each having its inner end pivoted between a pair of said plates and free to oscillate in a vertical plane radial of the shaft, the plates engaging an appreciable portion of said inner end.

8. In a device as in claim 7, a car frame mounted on the outer end of each of said sweeps and having a castor pivotally depending therefrom; an endless track of varying height surrounding the shaft engaging the castor to support the car frame; a car pivotally mounted on the car frame and means for tilting the car and influenced by the height of the track as the platform rotates.

9. An amusement device comprising, a circular platform rotary on a vertical axis; a plurality of long radial sweeps each pivoted at its inner end to the peripheral portion of the platform and free to oscillate in a vertical plane radial to the platform; a car frame transversely mounted fast on the outer end portion of each sweep; upright brackets at each end of the frame; a car pivotally swung between said brackets to pivot on an axis longitudinal to the frame; a downwardly disposed castor bracket pivotally mounted on the outer end portion of each of said sweeps to oscillate in a vertical plane radial to the platform; said castor including a wheel having broad flanges; an endless track surrounding the platform and frame receiving the flanged wheels; the track being of irregular slope and at such a distance from said vertical axis as to cause elevation of the outer ends of the sweeps when the platform is rotated; a pivot pin fast above the inner end of each sweep and a long link having its inner end pivoted to said pin and its outer end pivoted to the lower part of the adjacent side of the associated car for tilting the car when the sweep is raised and lowered.

10. An amusement device comprising, a circular platform rotary on a vertical axis; a plurality of long radial sweeps each pivoted at its inner end to the peripheral portion of the platform and free to oscillate in a vertical plane radial to the platform; a car frame transversely disposed at the outer end of each sweep and mounted on the sweep for oscillatory movement about the longitudinal axis of the sweep; upright brackets at each end of the frame; a car pivotally swung between said brackets to pivot on an axis longitudinal to the frame; a downwardly disposed castor pivotally mounted on each end of the frame to oscillate on the longitudinal axis of the frame in a plane transverse to the frame; said castor including a wheel having broad flanges; an endless track surrounding the platform and frame receiving the flanged wheels; the track being of irregular slope and at such a distance from said vertical axis as to cause elevation of the outer ends of the sweeps when the platform is rotated; a pivot pin fast above the inner end of each sweep and a long link having its inner end pivoted to said pin and its outer end pivoted to the lower part of the adjacent side of the associated car for tilting the car when the sweep is raised and lowered.

11. An amusement device comprising, a circular platform rotary on a vertical axis; a plurality of long radial sweeps each pivoted at its inner end to the peripheral portion of the platform and free to oscillate in a vertical plane radial to the platform; a car frame transversely disposed at the outer end of each sweep and mounted on the sweep for oscillatory movement about the longitudinal axis of the sweep; upright brackets at each end of the frame; a car pivotally swung between said brackets to pivot on an axis longitudinal to the frame; a downwardly disposed castor pivotally mounted on each end of the frame to oscillate on the longitudinal axis of the frame in a plane transverse to the frame, said castor including a wheel having broad flanges; an arm secured fast on one of said castors and projecting laterally of the car and provided with an upturning end; and a link having its end respectively pivotally connected to said upturned end and the side of the car, for oscillating the car as the angle between the car frame and the castor varies; and an endless track surrounding the platform and frame receiving the flanged wheels; the track being of irregular slope and at such a distance from said vertical axis as to cause transverse tilting of the car and elevation of the car ends and the outer ends of the sweeps when the platform is rotated.

12. An amusement device comprising, a circular platform rotary on a vertical axis; a plurality of long radial sweeps each pivoted at its inner end to the peripheral portion of the platform and free to oscillate in a vertical plane radial to the platform; a car frame transversely mounted fast on the outer end portion of each sweep; upright brackets at each end of the frame; a car pivotally swung between said brackets to pivot on an axis longitudinal to the frame; a downwardly disposed castor bracket pivotally mounted on the outer end portion of each of said sweeps to oscillate in a vertical plane radial to the platform; an arm secured fast on said castor and projecting laterally of the car and provided with an upturning end; and a link having its ends respectively pivotally connected to said upturned end and the side of the car, for oscillating the car as the angle between the car frame and the castor varies.

13. An amusement device comprising a rotatable platform; a plurality of long radial sweeps pivoted to the platform for movement in a vertical plane radial to the platform; a car frame mounted on the outer end of each sweep; a car pivotally mounted on said frame to pivot on an axis longitudinal to the frame; a link connected to the lower part of the car and pointing toward the center of the platform; a castor pivotally mounted on the frame to oscillate below the frame in a plane transverse to the car frame on on axis longitudinal to the car axis; the castor including a wheel having broad flanges; and a single endless track having a transversely horizontal top face of irregular slope surrounding the platform and supporting the wheel between the flanges and so disposed relative to the length of the sweep as to maintain the castor and its longitudinal axis and the mid-point of the wheel vertically above and flat on the track at the point of contact as the height varies thereby to maintain the stress on the track vertically downward to avoid side stress on the track; and means influenced by the variations in the track height for pushing and pulling on said link for causing said car to oscillate as the platform rotates; said sweeps holding the car frame against the outward pushing action of the link.

14. An amusement device comprising a member rotatable on a vertical axis; a long radial sweep pivoted to the member for movement in a vertical plane radial to the platform; a car frame mounted on the outer end of the sweep; a car pivotally mounted on said frame to pivot on an axis longitudinal to the frame and transverse to the sweep; a link connected to the lower part of the car and pointing toward the axis of said member; a castor pivotally mounted below the frame and sweep to oscillate below the frame in a plane transverse to the car frame on an axis longitudinal to the car axis; the castor including a single wheel having broad flanges; and an endless track of irregular slope surrounding said member and engaging and supporting the wheel between its flanges and so disposed relative to the length of the sweep as to maintain the castor, its axis and the mid-point of the wheel vertically above the track at the point of contact as the height of said track varies; and means influenced by the variations in the track height for pushing and pulling on said link for causing said cars to oscillate as the platform rotates; said sweeps holding the car frame against the outward pushing action of the link.

15. An amusement device comprising a rotatable platform; a sweep pivoted at its inner end to the periphery of the platform for up and down movement; a car frame pivotally mounted on the outer part of the sweep; and a track of irregular slope surrounding the platform; a wheel under the car engaging the track for supporting the car and outer part of the sweep on the track; a horizontal pivot pin mounted above and spaced from the inner end of the sweep; and a long link having its inner end pivoted to said pin and its outer end pivoted to the lower part of the adjacent side of the associated car for tilting the car when the sweep is raised and lowered; said pivot pin being adjustable at different heights above said inner end of the sweep thereby adjusting the amount of tilt of the car.

16. An amusement device comprising a rotatable platform; a sweep pivoted at its inner end to the periphery of the platform for up and down movement; a car frame pivotally mounted on the outer part of the sweep; and a track of irregular slope surrounding the platform; a wheel under the car engaging the track for supporting the car and outer part of the sweep on the track; a horizontal pivot pin mounted above and spaced from the inner end of the sweep; and a long link having its inner end pivoted to said pin and its outer end pivoted to the lower part of the adjacent side of the associated car for tilting the car when the sweep is raised and lowered; the height of said pivot pin above said inner end of the sweep determining the amount of tilt of the car.

17. An amusement device comprising a rotatable platform; an endless track of irregular height and slope surrounding the platform; a plurality of long radial sweeps pivoted to the platform for movement in a vertical plane radial to the platform; a car frame pivotally mounted on the outer end of each sweep for oscillation on an axis longitudinal to the sweep; a car pivotally mounted on said frame to pivot on an axis longitudinal to the frame; a link connected to the lower part of the car and pointing toward the platform axis; castors pivotally mounted on the frame to oscillate below the frame in a plane transverse to the car frame and including wheels supported one after the other on the track and having broad flanges engaging the track and constituting means influenced by the variations in the track slope for causing said car to oscillate on said longitudinal axis as the said platform rotates, and means influenced by the variations in the track height for pushing and pulling on said link for causing said cars to oscillate relative to the car frame as the platform rotates.

JOHN D'ERRICO.